United States Patent
Bauer

(10) Patent No.: US 10,129,087 B2
(45) Date of Patent: *Nov. 13, 2018

(54) APPLICATION SERVICE LOCATION AND MANAGEMENT SYSTEM

(71) Applicant: INTEL CORPORATION, Santa Clara, CA (US)

(72) Inventor: Blaine D. Bauer, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/409,130

(22) Filed: Jan. 18, 2017

(65) Prior Publication Data

US 2017/0257272 A1    Sep. 7, 2017

Related U.S. Application Data

(63) Continuation of application No. 13/997,337, filed as application No. PCT/US2012/036025 on May 1, 2012, now Pat. No. 9,571,343.

(51) Int. Cl.
  *G06F 15/16* (2006.01)
  *H04L 12/24* (2006.01)
  *H04L 29/08* (2006.01)

(52) U.S. Cl.
  CPC .......... *H04L 41/0856* (2013.01); *H04L 41/12* (2013.01); *H04L 67/18* (2013.01); *H04L 67/16* (2013.01)

(58) Field of Classification Search
  CPC .............. H04L 29/08648–29/08657; H04L 41/08–41/08; H04L 41/085–41/0863; H04L 41/12
  See application file for complete search history.

(56) References Cited

U.S. PATENT DOCUMENTS

| | | | |
|---|---|---|---|
| 7,302,593 B2* | 11/2007 | Rothman | G01S 5/14 713/300 |
| 7,685,248 B1* | 3/2010 | Fein | H04W 4/02 709/212 |

(Continued)

FOREIGN PATENT DOCUMENTS

| | | |
|---|---|---|
| TW | I250759 A | 1/2005 |
| TW | I350683 A | 2/2005 |

(Continued)

OTHER PUBLICATIONS

International Search Report and Written Opinion received for PCT Patent Application No. PCT/US2012/036025, dated Jan. 31, 2013, 9 Pages.

(Continued)

*Primary Examiner* — Brendan Y Higa
(74) *Attorney, Agent, or Firm* — Grossman, Tucker, Perreault & Pfleger, PLLC

(57) ABSTRACT

A system for locating and managing application services according to one embodiment includes a location determination circuit configured to determine a physical location of an associated server; and a service location management (SLM) agent associated with the server. The SLM agent is configured to maintain a registry of service applications provided by the server and to transmit multicast messages over a data center network. The multicast messages are configured to advertise: an identification (ID) of the server; the service applications provided by the server; and the physical location of the server.

24 Claims, 6 Drawing Sheets

(56) References Cited

U.S. PATENT DOCUMENTS

| | | | | |
|---|---|---|---|---|
| 8,312,116 | B2* | 11/2012 | Kohn | G06F 9/4416 709/222 |
| 8,751,613 | B1* | 6/2014 | Medved | H04L 45/00 709/220 |
| 2002/0095487 | A1* | 7/2002 | Day | H04L 29/06 709/223 |
| 2003/0046339 | A1 | 3/2003 | Ip | |
| 2004/0250130 | A1 | 9/2004 | Billharz et al. | |
| 2005/0138439 | A1* | 6/2005 | Rothman | G01S 5/14 713/300 |
| 2005/0192999 | A1* | 9/2005 | Cook | G06F 17/30241 |
| 2006/0150251 | A1 | 7/2006 | Takashima et al. | |
| 2009/0044259 | A1 | 2/2009 | Bookman et al. | |
| 2010/0306305 | A1* | 12/2010 | DeHaan | H04L 41/0853 709/203 |
| 2011/0258302 | A1 | 10/2011 | Cole et al. | |
| 2011/0304463 | A1 | 12/2011 | Groth et al. | |
| 2012/0030324 | A1 | 2/2012 | Kohn et al. | |
| 2012/0087301 | A1* | 4/2012 | Brandt | G06Q 10/087 370/328 |

FOREIGN PATENT DOCUMENTS

| | | |
|---|---|---|
| TW | I243554 B | 11/2005 |
| TW | I255626 B | 5/2006 |

OTHER PUBLICATIONS 802.1AB—Station and Media Access Control Connectivity Discovery, Apr. 5, 2005, 4 pages, IEEE.

Guttman, E., et al., Service Location Protocol, Version 2, Network Working Group, Request for Comments: 2608, Updates: 2165, Jun. 1999, 108 pages, The Internet Society.

Wadekar, Manoj, et al., "DCB Capability Exchange Protocol Base Specification," 33 pages, Intel. Available on the Internet at http://www.ieee802.org/1/files/public/docs2008/az-wadekar-dcbx-capability-exchange-discovery-protocol-1108-v1.01.pdf—prior to Mar. 11, 2014—Last modified date—Nov. 10, 2008.

"CA IT Client Manager Asset Inventory and Discovery," 2008, 5 pages, ca.com.

"Cisco Location Service Solution: Enabling Mobility in Wired and Wireless Networks with Modular Cisco Catalyst Platforms," http://www.cisco.com/en/US/solutions/ns340/ns629/arch_and_use_of_cisco_location_services.html, 2009-2011, 5 pages, Cisco.

International Preliminary Report on Patentability and Written Opinion from related case PCT/US2012/036025 dated Nov. 13, 2014, 6 pages.

Taiwan Search Report from related application TW102114584 dated Dec. 16, 2016 (English translation), 1 page.

Notice of Allowance issued in U.S. Appl. No. 13/997,337, dated Oct. 4, 2016, 15 pages.

Office Action issued in U.S. Appl. No. 13/997,337, dated May 6, 2016, 24 pages.

* cited by examiner

APPLICATION SERVICE LOCATION AND MANAGEMENT SYSTEM

CROSS-REFERENCE TO RELATED APPLICATION

The present application is a continuation of U.S. patent application Ser. No. 13/997,337 filed Mar. 11, 2014, which is a national stage of PCT Application No. PCT/US2012/036025, filed May 1, 2012, the entire disclosures of which are incorporated herein by reference.

FIELD

The present disclosure relates to application service location and management systems, and more particularly, to application service location and management systems that identify, locate and manage application services and the servers upon which they reside.

BACKGROUND

Large data centers often involve significant manual administration efforts. These tasks can be labor intensive, time consuming and prone to human error. In some cases, data centers may occupy many rooms, each room filled with numerous racks of equipment including large numbers of servers in each rack. Each server may host large numbers of application services along with associated software, operating systems, network interfaces, etc.

Typically, all of this information, regarding locations of servers and associated service applications and other related components, is manually entered in a database. The resulting database may therefore not always be kept up to date and may contain errors. Additionally, shared components such as virtualized server platforms are often not correlated with the applications that they support, leading to further inaccuracies in the database. Furthermore, when new servers are installed, system administrators must manually determine where rack space and power are available. If there are errors in the database with respect to locations, a physical search of all the racks must be performed which is also time consuming and which depends on the existence of accurate physical labeling on the servers.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for application service location and management. These systems may identify, locate and manage application services and the servers upon which they reside. A Service Location Management (SLM) agent may reside on each of the servers and maintain a registry of the physical location of the server as well as the installed applications on that server. The SLM agent may communicate this information over a data center network to an SLM manager which coordinates the information from multiple servers, distributed throughout various racks, and register it with a Configuration Management Database (CMDB).

In some embodiments a data center resource manager (RM) may use the SLM data in the CMDB to provision hardware resources. For example, when a service application provided by a server is not longer required, the RM may power down that server. Similarly, when a service is running low on resources, the RM can wake or reboot one or more servers.

Figure 1:
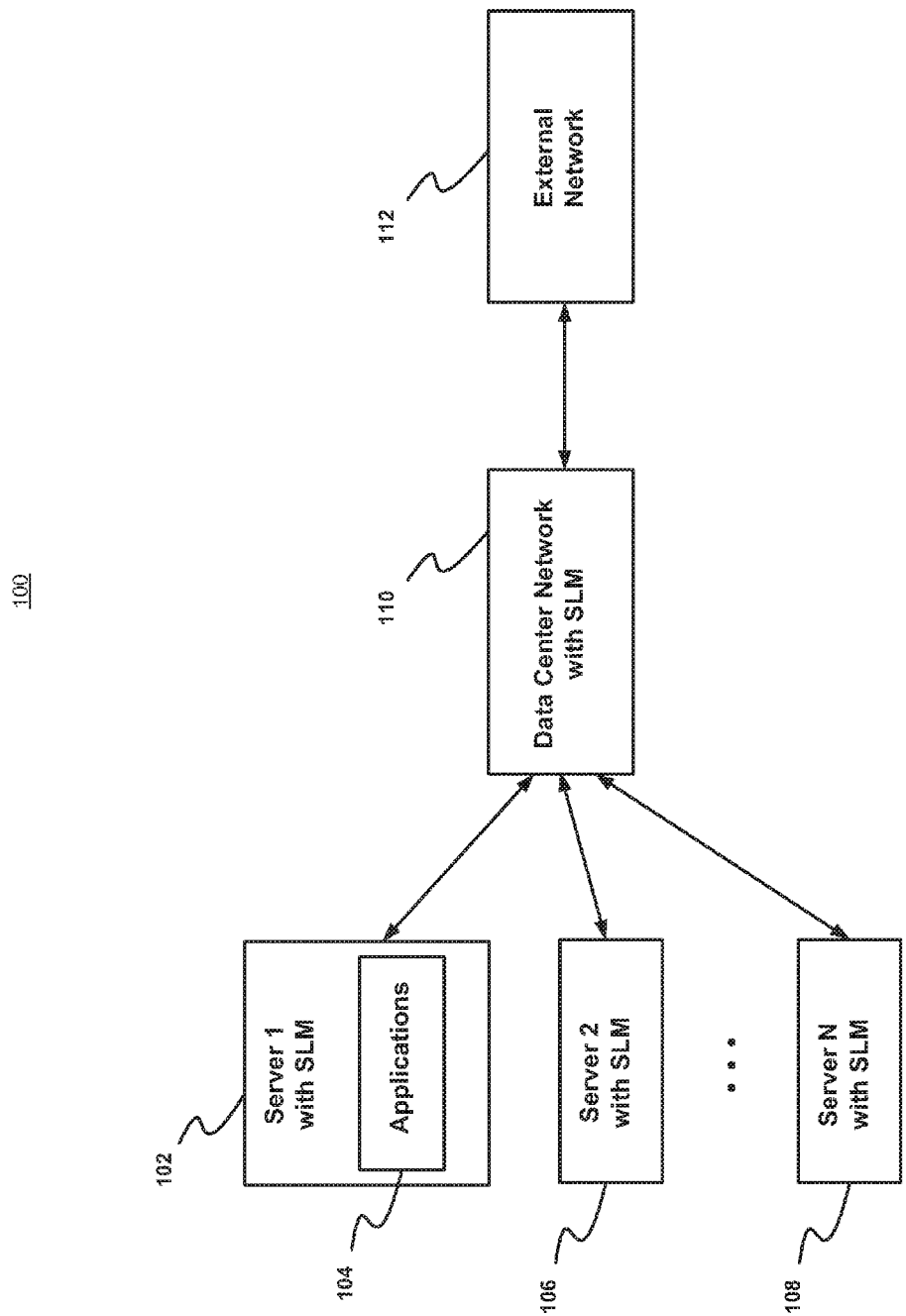
FIG. 1 illustrates a top level system diagram of one exemplary embodiment consistent with the present disclosure.

FIG. 1 illustrates a top level system diagram 100 of one exemplary embodiment consistent with the present disclosure. A data center may contain a number of servers 102, 106, 108. The servers may be part of a data center that provides Service Location Management (SLM), as will be described in more detail below. The servers 102, 106, 108 may be communicatively coupled through a data center network 110 which may be further coupled to an external network 112. Each of servers 102, 106, 108 may host a number of applications 104, also known as application services or service applications, which may be made available to clients throughout the networks 110 or 112. Applications 104 may comprise any number of applications, which may be unique to a server or duplicated on multiple servers, as needed, depending on, for example, demand for that application, licensing considerations or other factors.

Figure 2:
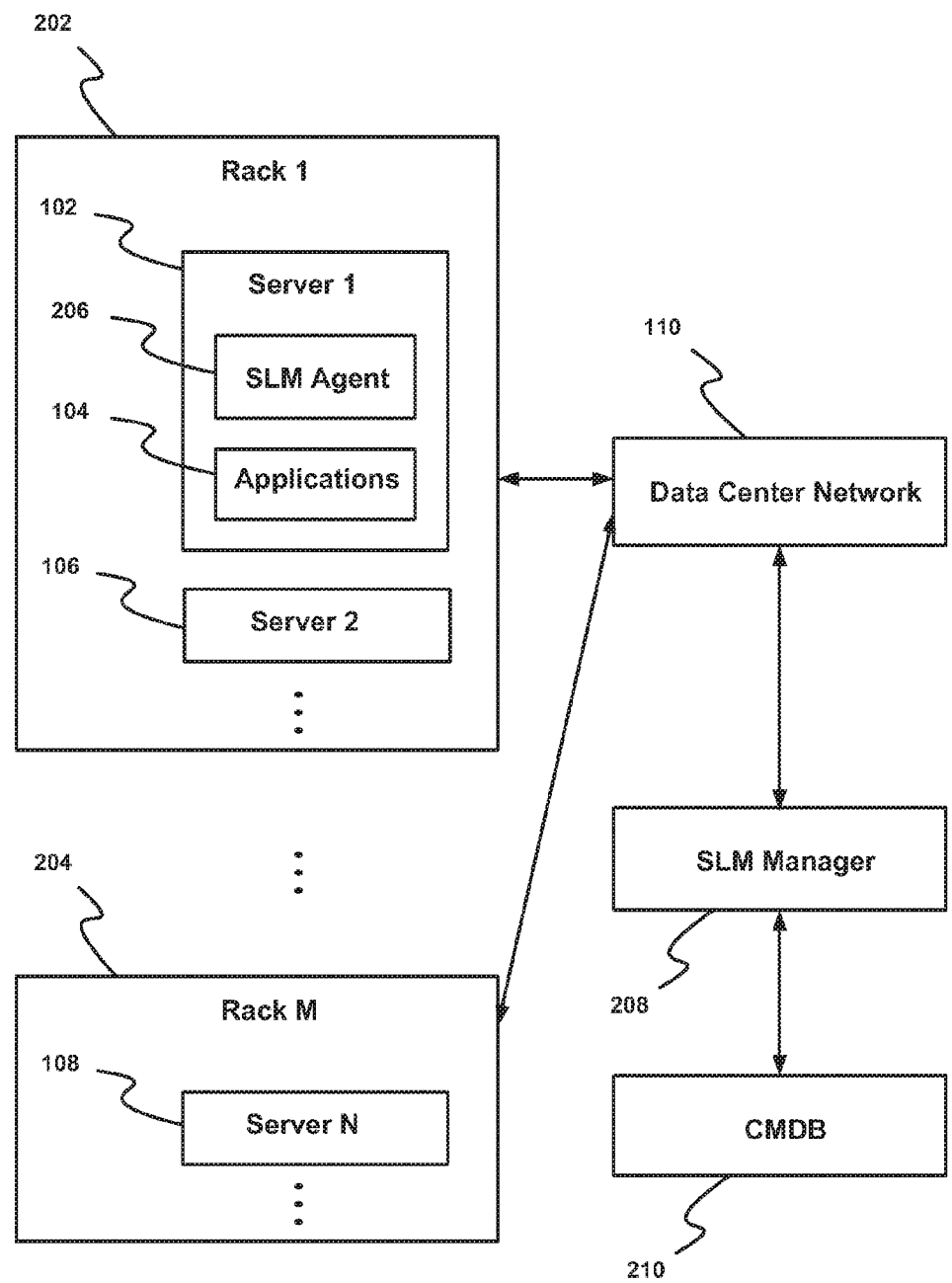
FIG. 2 illustrates a system block diagram of one exemplary embodiment consistent with the present disclosure.

FIG. 2 illustrates a system block diagram 200 of one exemplary embodiment consistent with the present disclosure. A data center may contain a number of equipment racks 202, 204 each containing a number of servers 102, 106, 108. Data center network 110 is provided to communicatively couple the servers to each other and to other components such as SLM Manager 208, to be described below. Each of servers 102, 106, 108 may host an SLM Agent 206 in addition to service application 104.

SLM agent 206 may be configured to provide a registry to record the physical location of the server as well as information to identify the applications 104 that are installed on that server. When an application 104 is installed on a server, the application may automatically register itself with the SLM Agent 206, if the application supports that capability, otherwise the registration may be accomplished as part of an installation script. The physical location may be entered manually, through a user interface associated with the server, or may be determined in an automated manner as will be described below.

In some embodiments, SLM Agent 206 may use Link Layer Discovery Protocol (LLDP) to inform neighboring devices on data center network 110 of the port number for the server 102 that hosts the SLM Agent 206. Server name, speed and duplex configuration may also be provided over LLDP using standard Type-Length-Value (TLV) fields in the LLDP frame structure. LLDP may also be used to provide the SLM Agent 206 with the name and address of the switch that is attached to the server 102 hosting the SLM Agent 206.

The SLM Agent 206 may be configured to transmit multicast messages comprising service advertisements to inform potential clients of the availability of service applications on the server 102 as maintained by the SLM Agent 206 in the registry. In some embodiments the multicast messages may further comprise physical information associated with the server 102 such as, for example, the identity of a neighbor switch, the row and rack location, the height and the power requirements. The multicast group may be maintained within the boundary of the data center network or may extend beyond it as needed.

The SLM Manager 208 provides centralized service location management and may be configured to listen for multicast advertisement messages from SLM Agents throughout the data center network. The SLM Manager 208 registers the received server information and service application information with a Configuration Management Database (CMDB) 210. The SLM Manager 208 may also transmit multicast service requests messages to which the SLM Agents may respond with updated information, thus enabling the SLM Manager 208 to refresh the CMDB 210. The SLM Manager 208 may also determine the identity of the network switch, using Simple Network Management Protocol (SNMP) or by querying the SLM Agent, and then register it as a service component in the CMDB 210.

Figure 3:
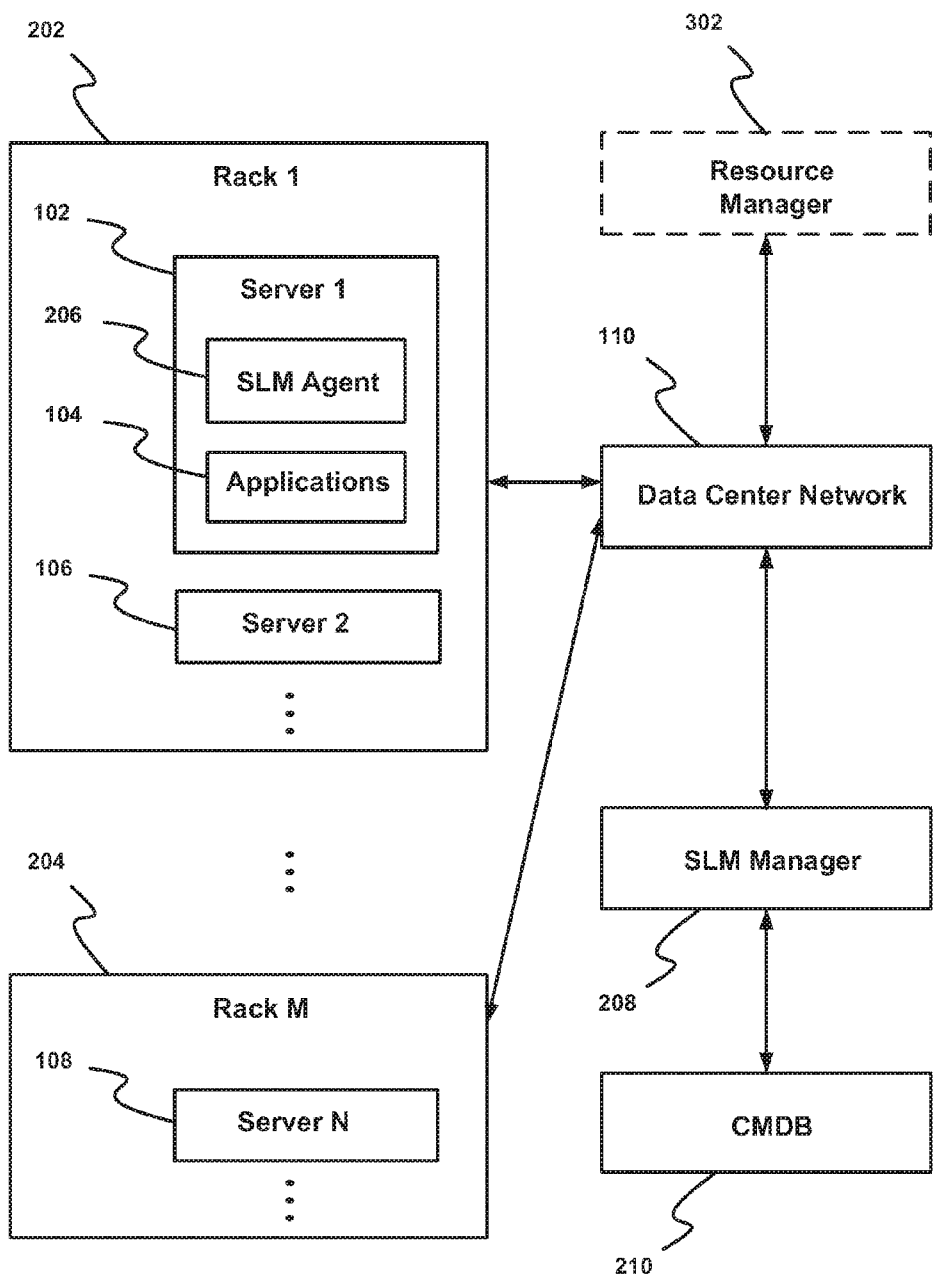
FIG. 3 illustrates a system block diagram of another exemplary embodiment consistent with the present disclosure.

FIG. 3 illustrates a system block diagram 300 of another exemplary embodiment consistent with the present disclosure. In this embodiment, an optional Resource Manager (RM) 302 is shown coupled the data center network 110. The RM 302 may be configured to utilize the SLM data, for example from the CMDB 210, to provision hardware resources. When a service application 104 is no longer required, the RM 302 may power down servers associated with that application. Alternatively, when a service application 104 is running low on hardware resources, the RM 302 may wake a server using wake-on-LAN (WOL) protocol, then boot the server using a pre-boot extension environment (PXE) and configure the network devices as required for the service. When a new server is to be installed, the RM 302 can identify racks with available space and power. The RM 302 can also provide location information for existing servers that need to be found. For servers that are in WOL standby mode, the RM 302 may periodically query the switch, using SNMP, to ensure that the server is still physically attached.

Figure 4:
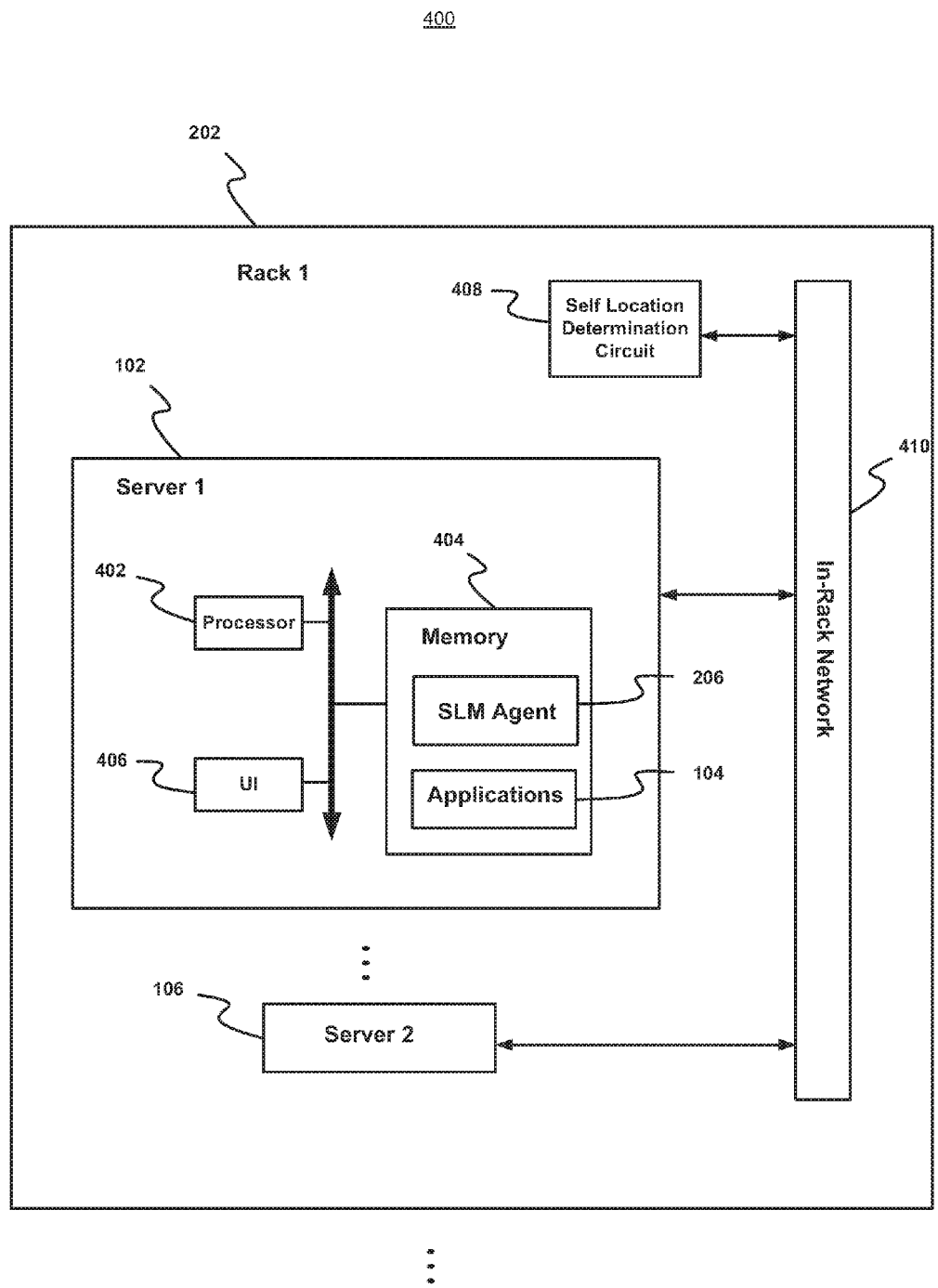
FIG. 4 illustrates a system block diagram of another exemplary embodiment consistent with the present disclosure.

FIG. 4 illustrates a system block diagram 400 of another exemplary embodiment consistent with the present disclosure. In this embodiment, an optional in-rack network 410 may be provided, enabling communication between multiple servers 102, 106 located in the same rack 202 even if a connection to the data center network 110 is not available. In some embodiments, the in-rack network 410 may be a Universal Serial Bus (USB) or Ethernet. In some embodiments, the in-rack network 410 may be a directional wireless network, such as, for example, Bluetooth with directional antennas to limit wireless connectivity to within the rack 202. The in-rack communications may support in-rack service application availability advertisements enabling the rack 202 to inform the servers of the availability of service applications on other servers within the rack 202.

A self location determination circuit 408 may also be provided within the rack 202 and may communicate with the servers 102, 106 over in-rack network 410, thus enabling the rack 202 to inform the servers 102, 106 of the location of the rack even when it is not connected to the data center network 110. In some embodiments, self location determination circuit 408 may be a USB or Bluetooth device or some other local communication device configured to obtain rack location information.

Server 102 is also shown to include, in some embodiments, a processor 402, a memory 402 and a user interface 406 coupled to each other through a bus. The memory may be configured to host the SLM Agent 206 and application services 104.

Figure 5:
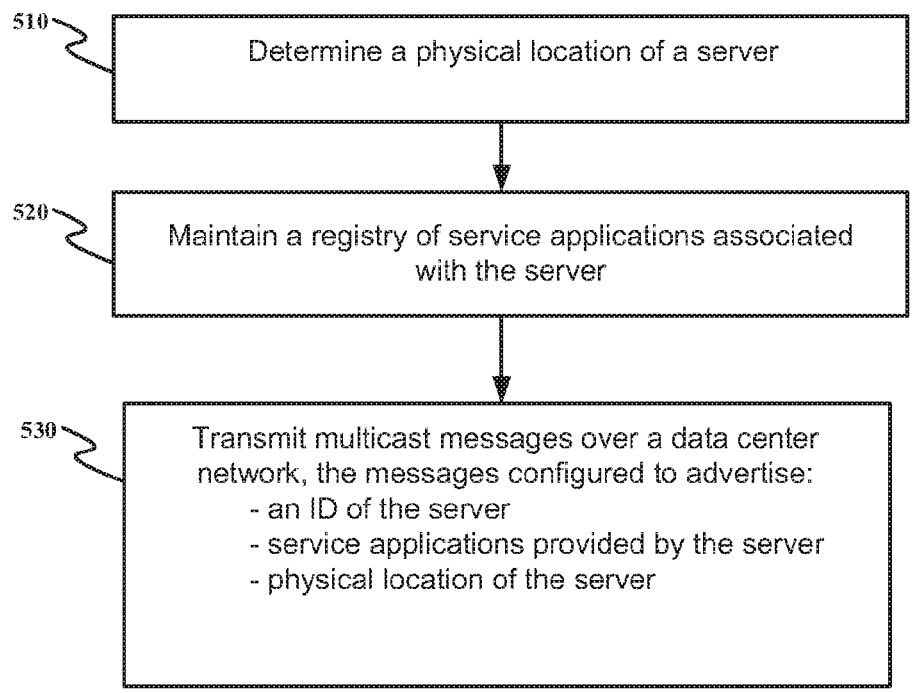
FIG. 5 illustrates a flowchart of operations of an exemplary embodiment consistent with the present disclosure.

FIG. 5 illustrates a flowchart of operations 500 of an exemplary embodiment consistent with the present disclosure. At operation 510, a determination of the physical location of the server is performed. At operation 520, a registry of service applications associated with the server is maintained. At operation 530, a multicast message is transmitted over a data center network. The message is configured to advertise an ID of the server, service applications provided by the server and the physical location of the server. In some embodiments, additional information may be transmitted in the message, including a server location within a rack, a server height requirement, a server power requirement and a neighboring switch identification.

Figure 6:
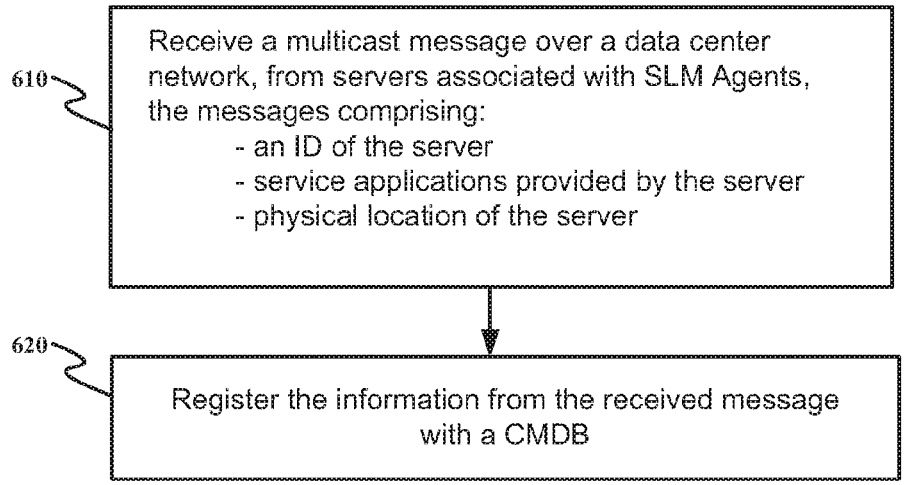
FIG. 6 illustrates a flowchart of operations of another exemplary embodiment consistent with the present disclosure.

FIG. 6 illustrates a flowchart of operations 600 of another exemplary embodiment consistent with the present disclosure. At operation 610, a multicast message is received over a data center network from one or more server associated SLM Agents. The multicast message may comprise an ID of the server, a list of service applications provided by the server, and a physical location of the server. At operation 620, the information from the received message is registered with a CMDB. In some embodiments, multicast messages may be transmitted over the data center network to request updated information from the server associated SLM Agents.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. A application service (or app) may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems and methods for the location and management of application services and associated servers, such as, for example, in a networked data center.

According to one aspect there is provided a system. The system may include a location determination circuit configured to determine a physical location of an associated server. The system of this example may also include an SLM agent associated with the server, the SLM agent configured to maintain a registry of service applications provided by the server, the SLM agent further configured to transmit multicast messages over a data center network, the multicast messages configured to advertise: an ID of the server; the service applications provided by the server; and the physical location of the server.

Another example system includes the forgoing components and the location determination circuit is integrated in a rack, the rack configured to house one or more of the servers.

Another example system includes the forgoing components and the location determination circuit is configured to receive location information over a local communication link.

Another example system includes the forgoing components and the local communication link is a USB and/or a Bluetooth device.

Another example system includes the forgoing components and further includes a network interface circuit configured to provide port numbers for the servers to network devices on the data center network.

Another example system includes the forgoing components and the network interface circuit is further configured to determine a name and address of an attached switch.

Another example system includes the forgoing components and the SLM agent is further configured to determine and store additional information in the registry, the information including a server location within a rack, a server height requirement, a server power requirement and/or a neighboring switch identification.

Another example system includes the forgoing components and further includes a local network configured to provide network communications between the servers housed in the rack and the location determination circuit, and the network communications include multicast messages configured to advertise: an ID of the servers; the service applications provided by the servers; and the physical location of the servers.

Another example system includes the forgoing components and the local network is an Ethernet, a Bluetooth device or a USB with directional antennas.

According to another aspect there is provided a system. The system may include an SLM manager configured to receive multicast messages over a data center network from one or more server associated SLM agents, the multicast messages including: an ID of the server; a list of service applications provided by the server; and a physical location of the server. The system of this example may also include a CMDB coupled to the SLM manager, and the SLM manager is further configured to register the server ID, the list of service applications and the physical location with the CMDB.

Another example system includes the forgoing components and further includes a resource manager configured to monitor demand for the service applications and adjust the number of the servers that are in a powered-up state in response to the demand.

Another example system includes the forgoing components and the resource manager is further configured to identify racks having available power and space for new server installations based on information in the CMDB.

Another example system includes the forgoing components and the resource manager is further configured to identify locations of severs based on information in the CMDB, the identification performed in response to received requests.

Another example system includes the forgoing components and the SLM manager is further configured to transmit multicast messages over the data center network, the multicast messages configured to request updated information from the SLM agents.

According to another aspect there is provided a method. The method may include determining a physical location of a server. The method of this example may also include maintaining a registry of service applications associated with the server. The method of this example may further include transmitting multicast messages over a data center network, the messages configured to advertise: an ID of the server; the service applications provided by the server; and the physical location of the server.

Another example method includes the forgoing operations and the determining of a physical location further includes receiving location information over a local communication link.

Another example method includes the forgoing operations and further includes providing port numbers for the servers to network devices on the data center network.

Another example method includes the forgoing operations and further includes determining a name and address of a switch attached to the servers.

Another example method includes the forgoing operations and further includes determining and storing additional information in the registry, the information including a server location within a rack, a server height requirement, a server power requirement and/or a neighboring switch identification.

Another example method includes the forgoing operations and further includes providing local network communications between a plurality of the servers housed in a rack, and the network communications include multicast messages configured to advertise: an ID of the servers; the service applications provided by the servers; and the physical location of the servers.

According to another aspect there is provided a method. The method may include receiving multicast messages over a data center network from one or more server associated SLM agents, the multicast messages including: an ID of the server; a list of service applications provided by the server; and a physical location of the server. The method of this example may also include registering information from the received message with a CMDB.

Another example method includes the forgoing operations and further includes monitoring demand for the service applications and adjusting the number of the servers that are in a powered-up state in response to the demand.

Another example method includes the forgoing operations and further includes identifying racks having available power and space for new server installations based on information in the CMDB.

Another example method includes the forgoing operations and further includes identifying locations of severs based on information in the CMDB, the identification performed in response to received requests.

Another example method includes the forgoing operations and further includes transmitting multicast messages over the data center network, the multicast messages configured to request updated information from the SLM agents.

Another example method includes the forgoing operations and further includes identifying the network switch and registering the network switch with the CMDB.

According to another aspect there is provided at least one computer-readable storage medium having instructions stored thereon which when executed by a processor, cause the processor to perform the steps of the method as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for locating and managing application services, the system comprising:
    a processor; and
    a memory hosting a service location management (SLM) manager, which when executed by the processor, is to receive multicast messages over a data center network from one or more server-associated SLM agents associated with one or more servers, the multicast messages including:
        an identification (ID) of the one or more servers;
        a list of service applications provided by the one or more servers; and
        a physical location of the one or more servers.

2. The system of claim 1, further comprising a configuration management database (CMDB) coupled to the SLM manager, wherein the SLM manager is further to register the server ID, the list of service applications and the physical location with the CMDB.

3. The system of claim 2, further comprising a resource manager to:
    monitor demand for the service applications; and
    adjust a number of the servers that are in a powered-up state in response to the demand.

4. The system of claim 3, wherein the resource manager is further to identify racks having available power and space for new server installations based on information in the CMDB.

5. The system of claim 3, wherein the resource manager is further to identify locations of the one or more servers based on information in the CMDB, the identification performed in response to received requests.

6. The system of claim 1, wherein the SLM manager is further to transmit multicast messages over the data center network, the multicast messages to request updated information from the SLM agents.

7. The system of claim 1, wherein the SLM manager is further coupled to an external network via the data center network.

8. The system of claim 7, wherein the SLM manager is further to transmit the received multicast messages to one or more clients via the external network.

9. A method for locating and managing application services, the method comprising:
    receiving multicast messages over a data center network from one or more server-associated service location management (SLM) agents associated with one or more servers, the multicast messages including:
        an identification (ID) of the one or more servers;
        a list of service applications provided by the one or more servers; and
        a physical location of the one or more servers.

10. The method of claim 9, further comprising registering information from the received message with a configuration management database (CMDB).

11. The method of claim 10, further comprising identifying racks having available power and space for new server installations based on information in the CMDB.

12. The method of claim 10, further comprising identifying locations of the one or more servers based on information in the CMDB, the identification performed in response to received requests.

13. The method of claim 10, further comprising:
    identifying a network switch; and
    registering the network switch with the CMDB.

14. The method of claim 9, further comprising transmitting multicast messages over the data center network, the multicast messages to request updated information from the SLM agents.

15. The method of claim 9, further comprising:
    monitoring demand for the service applications; and
    adjusting a number of the servers that are in a powered-up state in response to the demand.

16. The method of claim 9, further comprising transmitting the received multicast messages to one or more clients via an external network.

17. A non-transitory computer-readable storage medium having instructions stored thereon which when executed by a processor result in the following operations for locating and managing application services, the operations comprising:
    receive multicast messages over a data center network from one or more server-associated service location management (SLM) agents associated with one or more servers, the multicast messages including:
        an identification (ID) of the one or more servers;
        a list of service applications provided by the one or more servers; and
        a physical location of the one or more servers.

18. The non-transitory computer-readable storage medium of claim 17, wherein the operations further comprise register information from the received message with a configuration management database (CMDB).

19. The non-transitory computer-readable storage medium of claim 18, wherein the operations further comprise identify racks having available power and space for new server installations based on information in the CMDB.

20. The non-transitory computer-readable storage medium of claim 18, wherein the operations further comprise identify locations of the one or more servers based on information in the CMDB, the identification performed in response to received requests.

21. The non-transitory computer-readable storage medium of claim 18, wherein the operations further comprise transmit multicast messages over the data center network, the multicast messages to request updated information from the SLM agents.

22. The non-transitory computer-readable storage medium of claim 18, wherein the operations further comprise:
   identify a network switch; and
   register the network switch with the CMDB.

23. The non-transitory computer-readable storage medium of claim 17, wherein the operations further comprise:
   monitor demand for the service applications; and
   adjust a number of the one or more servers that are in a powered-up state in response to the demand.

24. The non-transitory computer-readable storage medium of claim 17, wherein the operations further comprise transmit the received multicast messages to one or more clients via an external network.

\* \* \* \* \*